US011240465B2

United States Patent
Qin et al.

(10) Patent No.: US 11,240,465 B2
(45) Date of Patent: Feb. 1, 2022

(54) SYSTEM AND METHOD TO USE DECODER INFORMATION IN VIDEO SUPER RESOLUTION

(71) Applicant: Alibaba Group Holding Limited, Grand Cayman (KY)

(72) Inventors: Minghai Qin, Hangzhou (CN); Tae Meon Bae, Hangzhou (CN); Guanlin Wu, Hangzhou (CN); Yen-kuang Chen, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 16/797,809

(22) Filed: Feb. 21, 2020

(65) Prior Publication Data

US 2021/0266496 A1    Aug. 26, 2021

(51) Int. Cl.
| | | |
|---|---|---|
| *H04N 7/01* | (2006.01) | |
| *H04N 5/14* | (2006.01) | |
| *H04N 9/87* | (2006.01) | |
| *G06T 3/40* | (2006.01) | |
| *G11B 20/10* | (2006.01) | |

(52) U.S. Cl.
CPC ......... *H04N 7/0117* (2013.01); *G06T 3/4046* (2013.01); *G06T 3/4053* (2013.01); *G11B 20/10527* (2013.01); *H04N 5/144* (2013.01); *H04N 9/87* (2013.01)

(58) Field of Classification Search
CPC .................................................. G06T 3/4053
See application file for complete search history.

(56) References Cited

U.S. PATENT DOCUMENTS

| | | |
|---|---|---|
| 5,126,962 A | 6/1992 | Chiang |
| 5,134,480 A | 7/1992 | Wang et al. |
| 5,408,274 A | 4/1995 | Chang et al. |
| 5,703,965 A | 12/1997 | Fu et al. |
| 5,943,445 A | 8/1999 | Dufaux |
| 6,075,875 A | 6/2000 | Gu |
| 6,229,570 B1 | 5/2001 | Bugwadia et al. |
| 6,285,713 B1 | 9/2001 | Nakaya et al. |
| 6,466,618 B1 | 10/2002 | Messing et al. |
| 6,825,857 B2 | 11/2004 | Harasimiuk |
| 7,006,709 B2 | 2/2006 | Kang et al. |
| 7,215,831 B2 | 5/2007 | Altunbasak et al. |
| 7,324,594 B2 | 1/2008 | Lamboray et al. |
| 7,379,612 B2 | 5/2008 | Milanfar et al. |
| 7,477,802 B2 | 1/2009 | Milanfar et al. |
| 7,515,747 B2 | 4/2009 | Okutomi et al. |
| 7,636,393 B2 | 12/2009 | Kanamori et al. |
| 7,916,934 B2 | 3/2011 | Vetro et al. |
| 8,044,994 B2 | 10/2011 | Vetro et al. |

(Continued)

*Primary Examiner* — Girumsew Wendmagegn

(57) ABSTRACT

A system for using decoder information in video super resolution processing. A compressed video buffering module is used for receiving a compressed video stream and a decoder module is used for decoding the compressed video stream into an uncompressed stream and extracting motion vector information from the uncompressed stream. A video super resolution deep neural network processor module is used for processing the uncompressed stream in conjunction with the motion vector information to produce a video super resolution stream. An output buffer module is used for buffering the video super resolution stream for subsequent output.

20 Claims, 5 Drawing Sheets

(56) References Cited

U.S. PATENT DOCUMENTS

| | | |
|---|---|---|
| 8,351,685 B2 | 1/2013 | Ho et al. |
| 8,520,736 B2 | 8/2013 | Topiwala |
| 9,256,980 B2 | 2/2016 | Kirk |
| 9,398,215 B2 | 7/2016 | Richardt et al. |
| 10,499,081 B1 * | 12/2019 | Wang .................... H04L 65/604 |
| 2009/0274380 A1 * | 11/2009 | Wedi ......................... G06T 9/00 |
| | | 382/233 |
| 2010/0290529 A1 | 11/2010 | Topiwala |
| 2012/0134417 A1 * | 5/2012 | Layachi ................. H04N 19/61 |
| | | 375/240.16 |
| 2016/0253784 A1 | 9/2016 | Chen et al. |
| 2019/0147589 A1 * | 5/2019 | Zhou ........................ G06T 5/003 |
| | | 382/131 |
| 2021/0097646 A1 * | 4/2021 | Choi ....................... G06N 20/20 |

* cited by examiner

SYSTEM AND METHOD TO USE DECODER INFORMATION IN VIDEO SUPER RESOLUTION

FIELD OF THE INVENTION

Embodiments of the present invention are generally related to integrated circuit structures used in computer systems, including video decoder systems.

BACKGROUND OF THE INVENTION

Video super-resolution (VSR) is the task of upscaling a video from a low-resolution to a high-resolution. The goal in image and video super-resolution (SR) is to reconstruct a high-resolution (HR) image or video from its down-sampled low-resolution (LR) version.

Super resolution involves converting a lower resolution image, for example 720, to a higher resolution, for example 4K resolution. For example, increasing resolution by four times involves taking one pixel and expanding to 16 pixels. Video is usually stored in compressed form, which needs to be decoded to the spatial domain in order to perform VSR. This is typically done using post-processing.

For video super-resolution, current state-of-the-art approaches either process multiple low-resolution (LR) frames to produce each output high-resolution (HR) frame separately in a sliding window fashion or recurrently exploit the previously estimated HR frames to super-resolve the following frame.

One of the simpler ways of increasing image size is nearest-neighbor interpolation, replacing every pixel with the nearest pixel in the output frame. For upscaling, this means multiple pixels of the same color will be created. This can preserve sharp details in pixel art, but also introduce jaggedness in previously smooth images.

Bilinear and bi-cubic up sampling algorithms can also be used. Bilinear interpolation works by interpolating pixel color values, introducing a continuous transition into the output even where the original material has discrete transitions. Although this is desirable for continuous-tone images, this algorithm reduces contrast (sharp edges) in a way that may be undesirable for line art. Bi-cubic interpolation yields substantially better results, with only a small increase in computational complexity.

Recent advances in VSR have benefitted from the application of Deep Neural Networks (DNNs). They exploit a sequence of consecutive LR frames to generate a single HR frame, focusing on obtaining high-quality reconstruction results for each single frame.

As described above, video is usually stored in compressed form, which needs to be decoded to spatial domain in order to perform VSR. This is typically done using post-processing by a decoder. The problem however is that much of the information of the video from the decoder is ignored in the above described VSR processes. Unfortunately, this information can be helpful in performing higher accuracy VSR.

SUMMARY OF THE INVENTION

Embodiments of the present invention perform VSR by advantageously using motion vector information from an incoming video stream. Embodiments of the present invention advantageously incorporate motion vector information by using post-processing by a decoder.

Embodiments of the present invention implement a system for using decoder information in video super resolution processing. A compressed video buffering module is used for receiving a compressed video stream and a decoder module is used for decoding the compressed video stream into an uncompressed stream and extracting motion vector information from the uncompressed stream. A video super resolution deep neural network processor module is used for processing the uncompressed stream in conjunction with the motion vector information to produce a video super resolution stream. An output buffer module is used for buffering the video super resolution stream for subsequent output.

In one embodiment, a hardware accelerator is used to implement the compressed video buffering module, the decoder module, and the output buffer. In one embodiment, the video super resolution deep neural network is specially trained to perform video super resolution processing.

In one embodiment, a frame-based reconstruction module is used for buffering the uncompressed stream and providing the uncompressed stream to the video super resolution deep neural network for processing without the motion vector information. In one embodiment, the video super resolution deep neural network implements motion vector based reconstruction on each of a plurality of blocks of the uncompressed stream.

In one embodiment, the video super resolution deep neural network implements motion vector based reconstruction using a predicted motion vector on each of a plurality of blocks of the uncompressed stream. In one embodiment, the predicted motion vector comprises a machine learning based motion vector.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION

Figure 1:
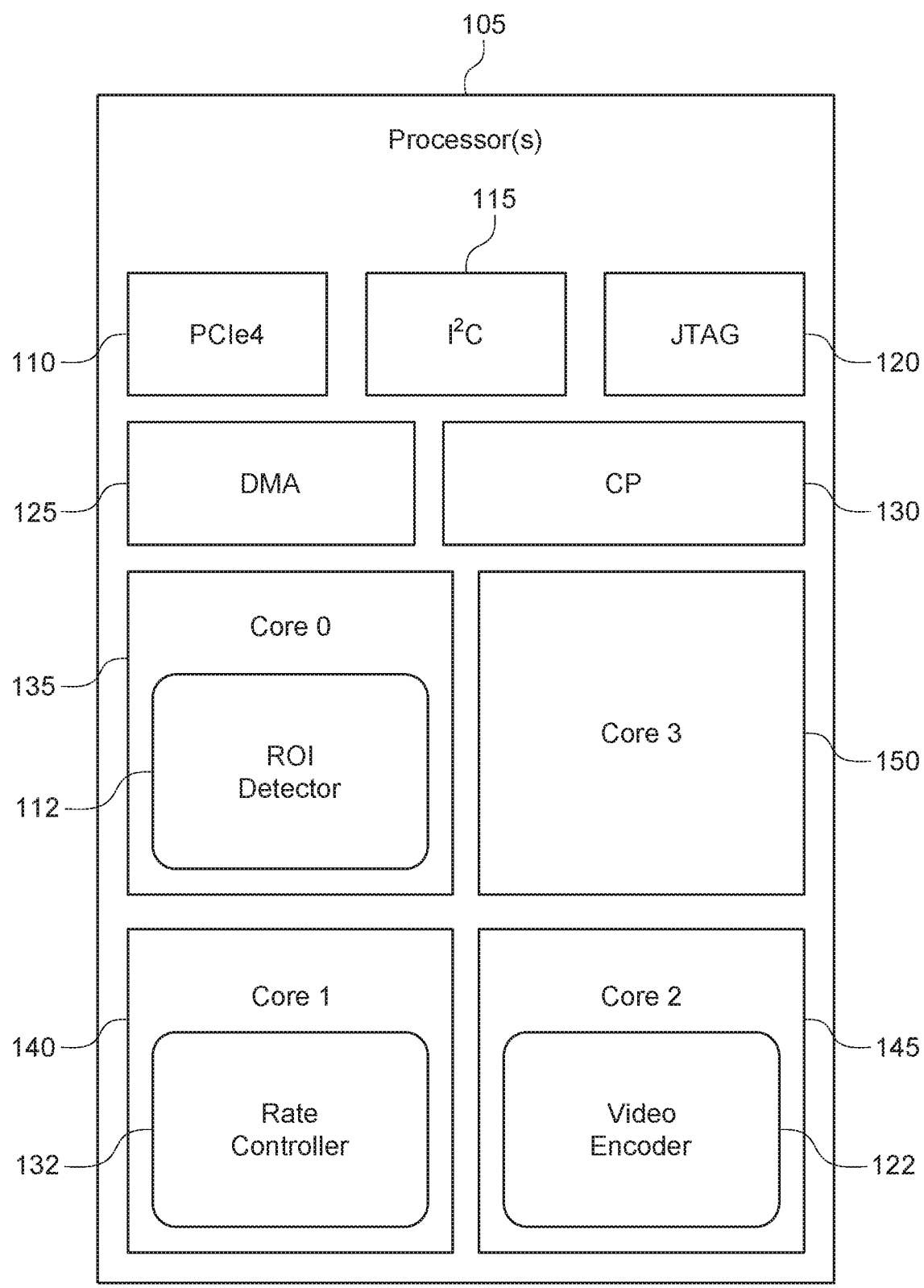
FIG. 1 is a block diagram of an example of a computing system in accordance with one embodiment of the present invention.

Reference will now be made in detail to the embodiments of the present technology, examples of which are illustrated in the accompanying drawings. While the present technology will be described in conjunction with these embodiments, it will be understood that they are not intended to limit the technology to these embodiments. On the contrary, the present technology is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

Some embodiments of the present technology which follow are presented in terms of routines, modules, logic blocks, and other symbolic representations of operations on data within one or more electronic devices. The descriptions and representations are the means used by those skilled in the art to most effectively convey the substance of their work to others skilled in the art. A routine, module, logic block and/or the like, is herein, and generally, conceived to be a self-consistent sequence of processes or instructions leading to a desired result. The processes are those including physical manipulations of physical quantities. Usually, though not necessarily, these physical manipulations take the form of electric or magnetic signals capable of being stored, transferred, compared and otherwise manipulated in an electronic device. For reasons of convenience, and with reference to common usage, these signals are referred to as data, bits, values, elements, symbols, characters, terms, numbers, strings, and/or the like with reference to embodiments of the present technology.

It should be borne in mind, however, that these terms are to be interpreted as referencing physical manipulations and quantities and are merely convenient labels and are to be interpreted further in view of terms commonly used in the art. Unless specifically stated otherwise as apparent from the following discussion, it is understood that through discussions of the present technology, discussions utilizing the terms such as "receiving," and/or the like, refer to the actions and processes of an electronic device such as an electronic computing device that manipulates and transforms data. The data is represented as physical (e.g., electronic) quantities within the electronic device's logic circuits, registers, memories and/or the like, and is transformed into other data similarly represented as physical quantities within the electronic device.

In this application, the use of the disjunctive is intended to include the conjunctive. The use of definite or indefinite articles is not intended to indicate cardinality. In particular, a reference to "the" object or "a" object is intended to denote also one of a possible plurality of such objects. The use of the terms "comprises," "comprising," "includes," "including" and the like specify the presence of stated elements, but do not preclude the presence or addition of one or more other elements and or groups thereof. It is also to be understood that although the terms first, second, etc. may be used herein to describe various elements, such elements should not be limited by these terms. These terms are used herein to distinguish one element from another. For example, a first element could be termed a second element, and similarly a second element could be termed a first element, without departing from the scope of embodiments. It is also to be understood that when an element is referred to as being "coupled" to another element, it may be directly or indirectly connected to the other element, or an intervening element may be present. In contrast, when an element is referred to as being "directly connected" to another element, there are not intervening elements present. It is also to be understood that the term "and or" includes any and all combinations of one or more of the associated elements. It is also to be understood that the phraseology and terminology used herein is for the purpose of description and should not be regarded as limiting.

Referring now to FIG. 1, an exemplary processing unit including a video processing unit, in accordance with aspects of the present technology, is shown. The processing unit 105 can include one or more communication interfaces, such as peripheral component interface (PCIe4) 110 and inter-integrated circuit (I²C) interface 115, an on-chip circuit tester, such as a joint test action group (JTAG) engine 120, a direct memory access engine 125, a command processor (CP) 130, and one or more cores 135-150. The one or more cores 135-150 can be coupled in a direction ring bus configuration. The one or more cores 135-150 can execute one or more sets of computing device executable instructions to perform one or more functions. The one or more functions can be performed on individual core 135-150, can be distributed across a plurality of cores 135-150, can be performed along with one or more other functions on one or more cores, and or the like.

The processor unit 105 can be a central processing unit (CPU), a graphics processing unit (GPU), a neural processing unit (NPU), a vector processor, a memory processing unit, or the like, or combinations thereof. In one implementation, one or more processors 105 can be implemented in a computing devices such as, but not limited to, a cloud computing platform, an edge computing device, a server, a workstation, a personal computer (PCs), or the like.

Figure 2:
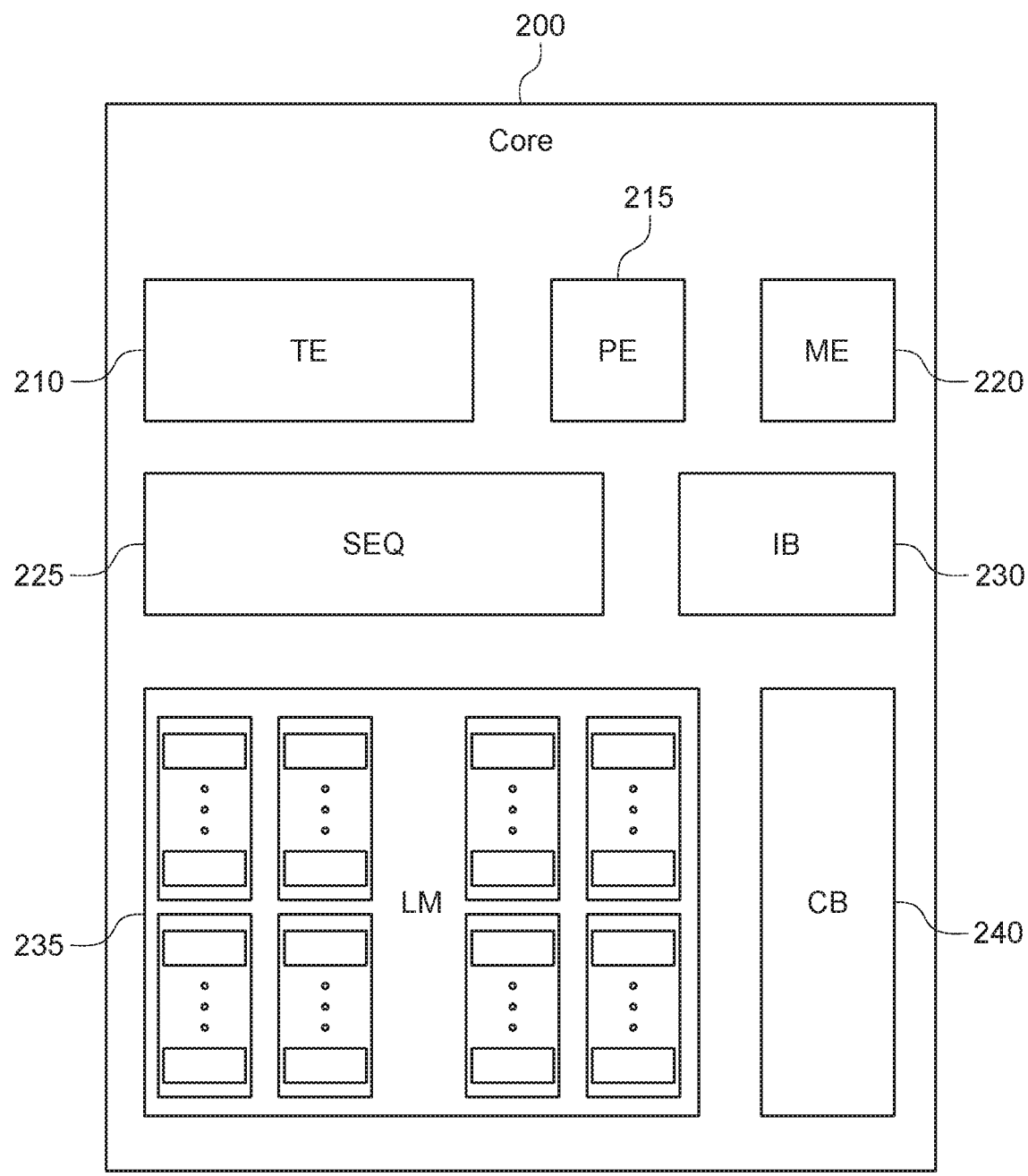
FIG. 2 is a block diagram of an exemplary processing core in accordance with one embodiment of the present invention.

Referring now to FIG. 2, a block diagram of an exemplary processing core, in accordance with aspects of the present technology, is shown. The processing core 200 can include a tensor engine (TE) 210, a pooling engine (PE) 215, a memory copy engine (ME) 220, a sequencer (SEQ) 225, an instructions buffer (IB) 230, a local memory (LM) 235, and a constant buffer (CB) 240. The local memory 235 can be pre-installed with model weights and can store in-use activations on-the-fly. The constant buffer 240 can store constant for batch normalization, quantization and the like. The tensor engine 210 can be utilized to accelerate fused convolution and or matrix multiplication. The pooling engine 215 can support pooling, interpolation, region-of-interest and the like operations. The memory copy engine 220 can be configured for inter- and or intra-core data copy, matrix transposition and the like. The tensor engine 210, pooling engine 215 and memory copy engine 220 can run in parallel. The sequencer 225 can orchestrate the operation of the tensor engine 210, the pooling engine 215, the memory copy engine 220, the local memory 235, and the constant buffer 240 according to instructions from the instruction buffer 230. The processing unit core 200 can provide video coding efficient computation under the control of operation fused coarse-grained instructions for functions such as region of interest detection, bit rate control, variable bit rate video encoding and or the like. A detailed description of the exemplary processing unit core 200 is not necessary to an understanding of aspects of the present technology, and therefore will not be described further herein.

Figure 3:
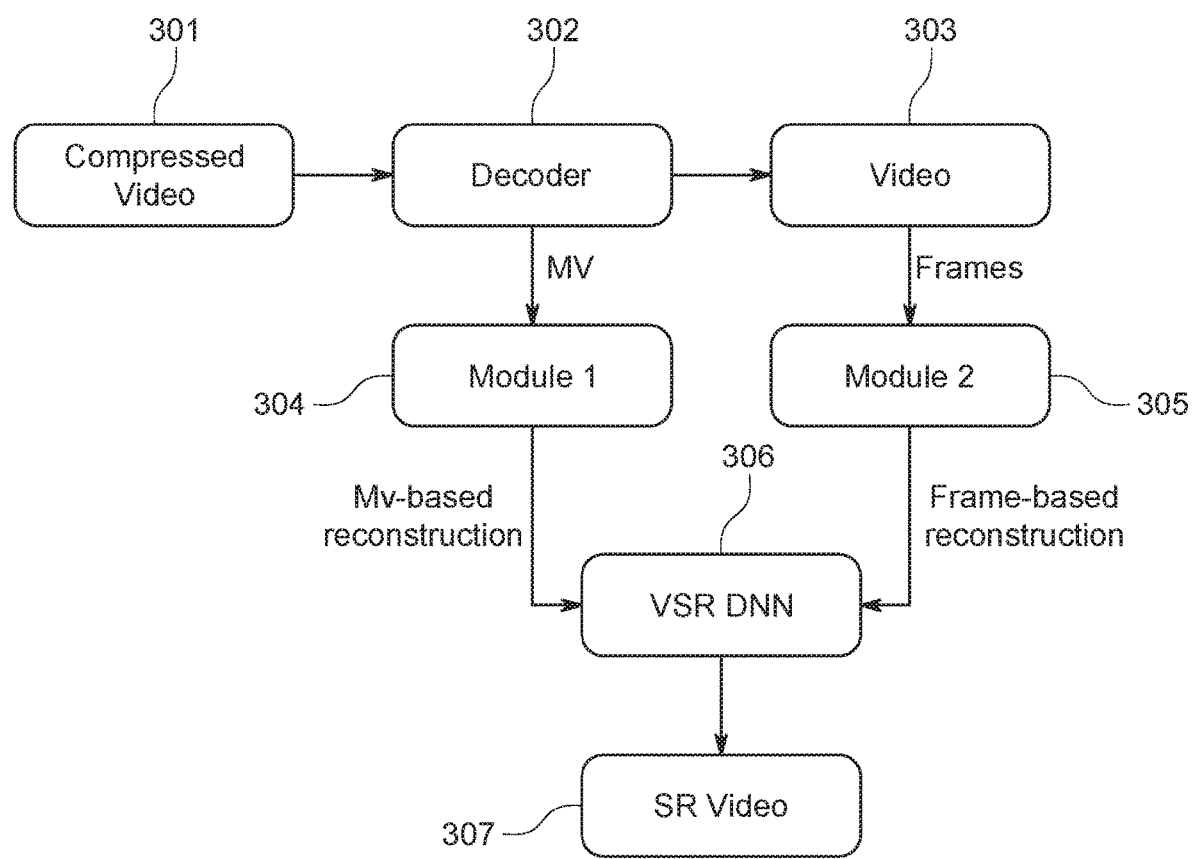
FIG. 3 shows a block diagram of a VSR processor in accordance with one embodiment of the present invention.

FIG. 3 shows a block diagram of a VSR processor in accordance with one embodiment of the present invention. FIG. 3 shows how compressed video 301 is received by a decoder 302. The compressed video 301 comprises a bitstream and can be from a number of different sources. For example, the compressed video can be from disk based media (e.g., Blu-ray), a satellite video stream, or cable video stream, or the like. The compressed video is processed by the decoder 302. In accordance with embodiments of the present invention, the decoder 302 can extract motion vectors from the compressed video 301 and forward these motion vectors to a motion vector-based reconstruction module 304, shown in FIG. 3 as module 1. Module 304 and then performs motion vector based video reconstruction. In one embodiment, another module can be included after the module 304 to provide extra reconstruction frames from the decoded video. The motion vector based video reconstruction is then provided to a VSR deep neural network (DNN).

The VSR DNN module 306 will process the incoming sequence of consecutive LR frames to generate a single HR frame, focusing on obtaining high-quality reconstruction results for each single frame. The VSR DNN module 306 will advantageously utilize the motion vector information obtained from the motion vector-based reconstruction module 304. The motion vector information greatly assists in the performance of higher accuracy VSR. The VSR DNN module 306 implements a DNN-based video super resolution engine that incorporates the motion vector information to generate super resolution images with high accuracy. In one embodiment, the DNN is specially trained to provide motion vector assisted super resolution processing. A super resolution video module 307 receives the super resolution video stream from the VSR DNN module 306 and buffers the stream for subsequent output.

As shown in FIG. 3, the preferred processing path is from the decoder 302 extracting the motion vectors and sending the resulting bitstream to the motion vector-based reconstruction module 304 (e.g., module 1). However, they may arise cases where motion vector information is not available. In these cases, the decoder sends the decoded video to a video buffer module 303, which then forwards the frames to a frame-based reconstruction module 305 (e.g., module 2). The VSR DNN module 306 will process the incoming sequence of consecutive LR frames to generate a single HR frame, focusing on obtaining high-quality reconstruction results for each single frame. In this case, however, the processing will be done without the advantage of motion vector-based reconstruction. The super resolution video module 307 receives the super resolution video stream from the VSR DNN module 306 and buffers the stream for subsequent output.

In one embodiment, each of the modules 301-307 are implemented as computational hardware accelerated modules. This greatly speeds the processing frame rates for producing VSR video.

Figure 4:
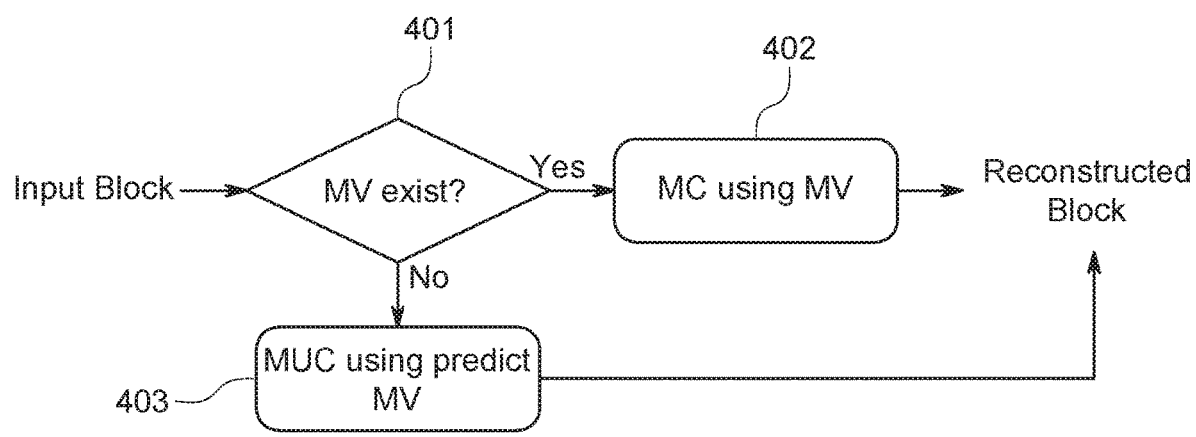
FIG. 4 shows a block diagram of a VSR block reconstruction process as performed by the VSR DNN in accordance with one embodiment of the present invention.

FIG. 4 shows a block diagram of a VSR block reconstruction process as performed by the VSR DNN in accordance with one embodiment of the present invention. FIG. 4 shows how input blocks are received by the DNN at step 401 and are examined to determine whether motion vectors exist within the input block. If the motion vectors exist within the input block, then at step 402, motion compensation is used with the assistance of the motion vectors. This results in the reconstructed block. However, if motion vectors do not exist within the incoming blocks, the flow path proceeds to step 403. At step 403, motion unassisted compensation (MUC) is performed by generating a predicted motion vector. The motion unassisted compensation (MUC) predicted motion vector is used to generate the reconstructed block.

Figure 5:
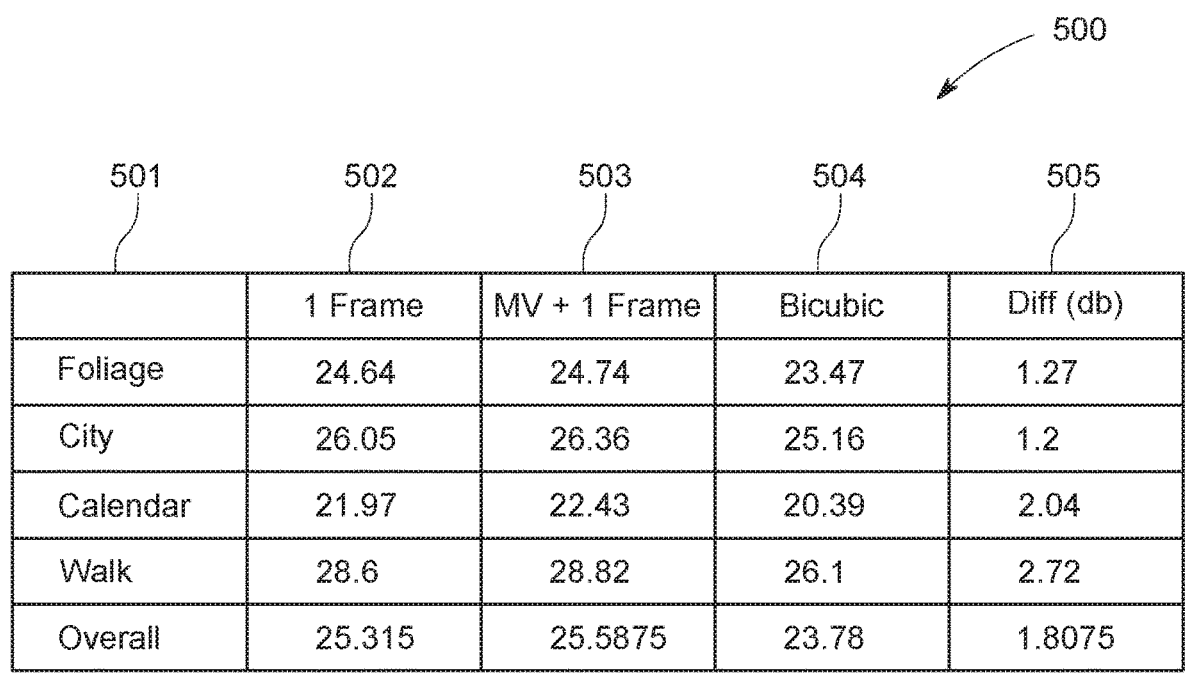
FIG. 5 shows a block diagram of a table comparing the differences between motion vector assisted VSR and conventional bi-cubic VSR in accordance with one embodiment of the present invention.

FIG. 5 shows a block diagram of a table 500 comparing the differences between motion vector assisted VSR and conventional bi-cubic VSR in accordance with one embodiment of the present invention. Column 501 shows a description of the image characterizing whether the image is foliage (e.g., trees), a cityscape, a calendar (e.g., wall calendar), a person walking, and across the bottom row, the overall average of each of the above. Column 502 provides an indication of the complexity of the image stream in the form of decibels. Column 503 shows the up sampled complexity of a motion vector assisted processed frame in decibels. Column 504 shows the up sampled complexity of conventional bi-cubic processed frame without utilizing motion vector information. Column 505 shows the difference in decibels between the motion vector assisted processed frames and the conventional bi-cubic processed frames. As shown in table 500, the motion vector assisted processed frames have considerably more information.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A system for video super resolution processing; comprising:
   a decoder to decode a compressed video stream into an uncompressed stream and extract motion vector information from the uncompressed stream;
   a video buffer to receive, when the motion vector information is not available, the uncompressed stream from the decoder;
   a motion vector-based reconstruction processor to perform, when the motion vector information is available, motion vector-based video reconstruction based on the motion vector information received from the decoder, to generate motion vector-based reconstructed frames;
   a frame-based reconstruction processor to perform, when the motion vector information is not available, frame-based video reconstruction based on frames in the uncompressed stream received from the video buffer, to generate frame-based reconstructed frames; and
   a video super resolution deep neural network processor to receive the motion vector-based reconstructed frames from the motion vector-based reconstruction processor and the frame-based reconstructed frames from the frame-based reconstruction processor, and process the motion vector-based reconstructed frames and the frame-based reconstructed frames to produce a video super resolution stream.

2. The system of claim 1, wherein the decoder, the video buffer, the motion vector-based reconstruction processor, and the frame-based reconstruction processor are implemented using a hardware accelerator.

3. The system of claim 1, wherein the video super resolution deep neural network processor is trained to perform video super resolution processing.

4. The system of claim 1, further comprising an output buffer to buffer the video super resolution stream received from the video super resolution deep neural network processor for subsequent output.

5. The system of claim 1, wherein the video super resolution deep neural network processor implements the motion vector-based video reconstruction on each of a plurality of blocks of the uncompressed stream.

6. The system of claim 1, wherein the video super resolution deep neural network processor implements the motion vector-based video reconstruction using a predicted motion vector on each of a plurality of blocks of the uncompressed stream.

7. The system of claim 6, wherein the predicted motion vector comprises a machine learning-based motion vector.

8. A method for using decoder information in video super resolution processing, comprising:
using a decoder to decode a compressed video stream into an uncompressed stream and extract motion vector information from the uncompressed stream;
using a video buffer to receive, when the motion vector information is not available, the uncompressed stream from the decoder;
using a motion vector-based reconstruction processor to perform, when the motion vector information is available, motion vector-based video reconstruction based on the motion vector information received from the decoder, to generate motion vector-based reconstructed frames;
using a frame-based reconstruction processor to perform, when the motion vector information is not available, frame-based video reconstruction based on frames in the uncompressed stream received from the video buffer, to generate frame-based reconstructed frames; and
using a video super resolution deep neural network processor to receive the motion vector-based reconstructed frames from the motion vector-based reconstruction processor and the frame-based reconstructed frames from the frame-based reconstruction processor, and process the motion vector-based reconstructed frames and the frame-based reconstructed frames to produce a video super resolution stream.

9. The method of claim 8, wherein the video buffer, the motion vector-based reconstruction processor, and the frame-based reconstruction processor are implemented using a hardware accelerator.

10. The method of claim 8, wherein the video super resolution deep neural network processor is trained to perform video super resolution processing.

11. The method of claim 8, wherein the frame-based reconstruction processor is operable for buffering the uncompressed stream and providing the uncompressed stream to the video super resolution deep neural network processor for processing without the motion vector information.

12. The method of claim 8, wherein the video super resolution deep neural network processor implements the motion vector-based video reconstruction on each of a plurality of blocks of the uncompressed stream.

13. The method of claim 8, wherein the video super resolution deep neural network processor implements the motion vector-based video reconstruction using a predicted motion vector on each of a plurality of blocks of the uncompressed stream.

14. The method of claim 13, wherein the predicted motion vector comprises a machine learning-based motion vector.

15. A device for using decoder information in video super resolution processing, comprising:
a decoder to decode a compressed video stream into an uncompressed stream and extract motion vector information from the uncompressed stream;
a video buffer to receive, when the motion vector information is not available, the uncompressed stream from the decoder;
a motion vector-based reconstruction processor to perform, when the motion vector information is available, motion vector-based video reconstruction based on the motion vector information received from the decoder, to generate motion vector-based reconstructed frames;
a frame-based reconstruction processor to perform, when the motion vector information is not available, frame-based video reconstruction based on frames in the uncompressed stream received from the video buffer, to generate frame-based reconstructed frames; and
a video super resolution deep neural network processor to receive the motion vector-based reconstructed frames from the motion vector-based reconstruction processor and the frame-based reconstructed frames from the frame-based reconstruction processor, and process the motion vector-based reconstructed frames and the frame-based reconstructed frames to produce a video super resolution stream.

16. The device of claim 15, wherein a hardware accelerator is used to implement the video buffer, the decoder, and an output buffer.

17. The device of claim 15, wherein the video super resolution deep neural network processor implements the motion vector-based video reconstruction on each of a plurality of blocks of the uncompressed stream.

18. The device of claim 15, wherein the video super resolution deep neural network processor implements the motion vector-based video reconstruction using a predicted motion vector on each of a plurality of blocks of the uncompressed stream.

19. The device of claim 18, wherein the predicted motion vector comprises a machine learning based motion vector.

20. The device of claim 18, wherein the predicted motion vector comprises a median based motion vector.

* * * * *